United States Patent
Mashiko et al.

(10) Patent No.: US 7,385,005 B2
(45) Date of Patent: Jun. 10, 2008

(54) POLYVINYLACETAL RESIN AND PROCESS FOR PRODUCING THE SAME

(75) Inventors: Yoshihiro Mashiko, Niigata (JP);
Toshiaki Kawanishi, Niigata (JP);
Koichi Matsunaga, Niigata (JP);
Manabu Tsuzuki, Niigata (JP);
Kazumasa Matsuoto, Niigata (JP);
Koki Goto, Chiba (JP); Hitoshi Watanabe, Chiba (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 144 days.

(21) Appl. No.: 10/503,123

(22) PCT Filed: Feb. 7, 2003

(86) PCT No.: PCT/JP03/01327

§ 371 (c)(1),
(2), (4) Date: Aug. 9, 2004

(87) PCT Pub. No.: WO03/066690

PCT Pub. Date: Aug. 14, 2003

(65) Prior Publication Data
US 2005/0159545 A1 Jul. 21, 2005

(30) Foreign Application Priority Data
Feb. 7, 2002 (JP) .............................. 2002-030487
May 22, 2002 (JP) .............................. 2002-147345
Jan. 14, 2003 (JP) .............................. 2003-006019
Jan. 14, 2003 (JP) .............................. 2003-006020

(51) Int. Cl.
*C08F 8/00* (2006.01)
(52) U.S. Cl. .......................... 525/61; 525/56; 526/202
(58) Field of Classification Search ................. 525/61, 525/58, 56; 526/202
See application file for complete search history.

(56) References Cited

FOREIGN PATENT DOCUMENTS

| DE | 32 46 605 A1 | 6/1984 |
|---|---|---|
| DE | 196 17 893 C1 | 10/1997 |
| EP | 0 513 857 A1 | 11/1992 |
| GB | 1 447 520 | 8/1976 |
| JP | 63301208 A | * 12/1988 |
| JP | 4-55404 | 2/1992 |
| JP | 4-275310 | 9/1992 |
| JP | 5-1108 | 1/1993 |
| JP | 5-59117 | 3/1993 |
| JP | 05059117 A | * 3/1993 |
| JP | 5-97918 | 4/1993 |
| JP | 5-97919 | 4/1993 |
| JP | 05097918 A | * 4/1993 |
| JP | 5-140216 | 6/1993 |
| JP | 11-349629 | 12/1999 |
| JP | 2000-38456 | 2/2000 |
| JP | 2000038456 A | * 2/2000 |
| JP | 2000-336117 | 12/2000 |
| JP | 2000336117 A | * 12/2000 |
| WO | WO 94/13710 | 6/1994 |

OTHER PUBLICATIONS

Patent Abstracts of Japan, JP 05-059117, Mar. 9, 1993 (reference previously filed in Japanese language on Aug. 9, 2004).
Derwent Publications, AN 1983-21176, XP-002320217, JP 58-011046, Jan. 21, 1983.

* cited by examiner

*Primary Examiner*—Ling-Sui Choi
*Assistant Examiner*—M. Bernshteyn
(74) *Attorney, Agent, or Firm*—Oblon, Spivak, McClelland, Maier & Neustadt, P.C.

(57) ABSTRACT

A polyvinylacetal resin powder with a low metal content, being excellent in transparency, moisture resistance and electrical insulating properties and having a large specific surface area, and a process for its production, are presented. A polyvinylacetal resin powder obtained by reacting polyvinyl alcohol and an aldehyde in the presence of an acid catalyst, which has an acetalization degree of at least 60 mol %, a specific surface area of from 1.50 to 3.50 $m^2/g$, a bulk density of from 0.12 to 0.19 $g/cm^3$, an average particle diameter of from 0.5 to 2, 5 μm and a metal content of at most 80 ppm.

It is produced, for example, by feeding a reaction fluid containing polyvinyl alcohol, an aldehyde and an acid catalyst into a first reactor, to carry out an acetalization reaction, discharging the reaction fluid wherein the acetalization degree has reached from 10 to 60 mol %, and feeding the same into a second reactor to carry out a further reaction to bring the acetalization degree of polyvinylacetal to at least 65 mol %.

6 Claims, 1 Drawing Sheet

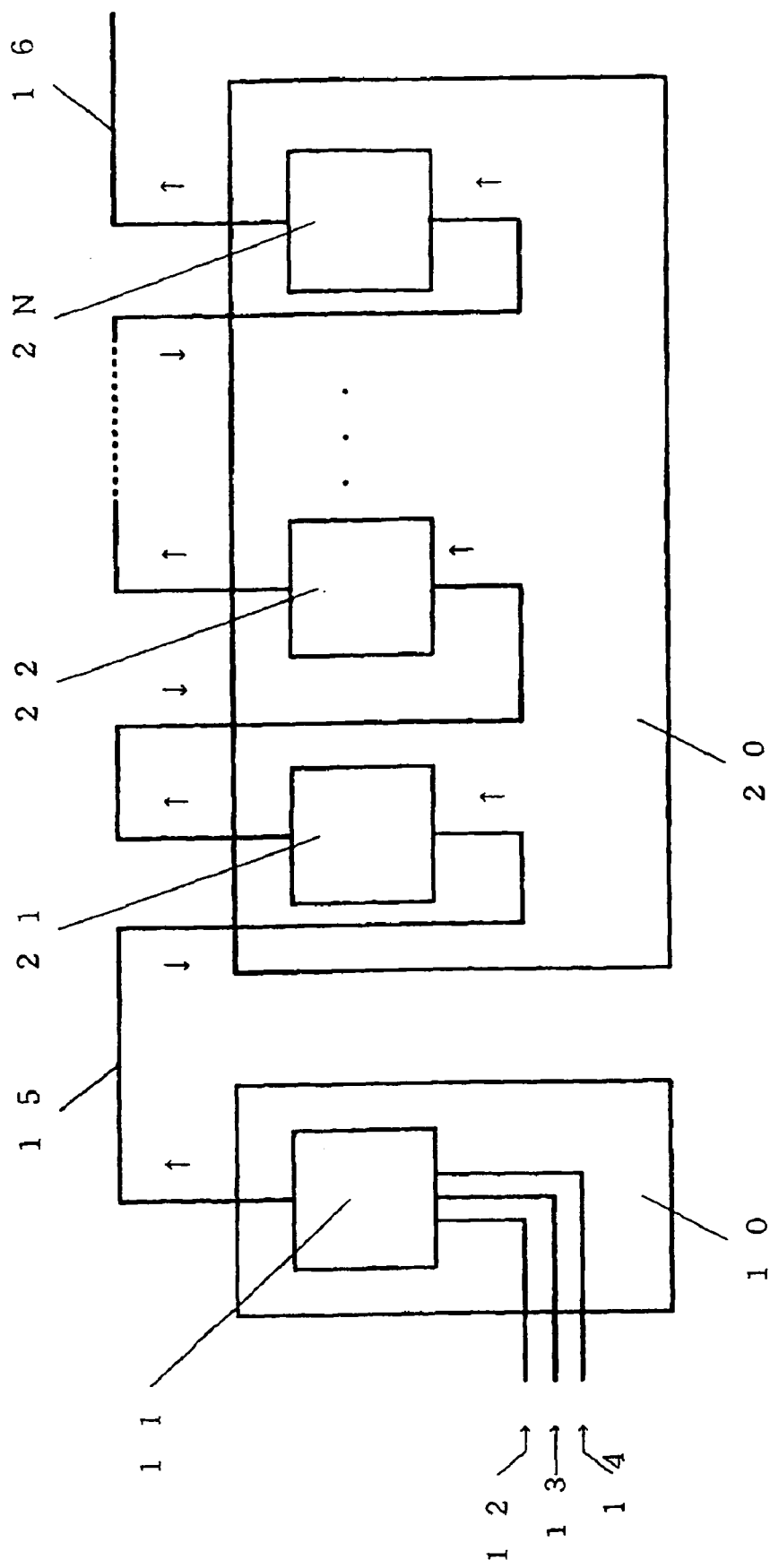

POLYVINYLACETAL RESIN AND PROCESS FOR PRODUCING THE SAME

TECHNICAL FIELD

The present invention relates to a porous polyvinylacetal resin which has a low content of a metal component such as an alkali metal and which is excellent in transparency, moisture resistance, electrical insulating properties, etc. and has a large specific surface area, and a novel process for its production.

BACKGROUND ART

Polyvinylacetal resins are widely used for various coating materials, adhesives, binders and molded products. Heretofore, for the production of a polyvinylacetal resin, it has been common to employ a process which comprises reacting polyvinyl alcohol and an aldehyde in an aqueous solution in the presence of an acid catalyst, neutralizing the resulting resin slurry of polyvinylacetal resin with an alkali, followed by dehydration, washing and then drying to obtain it in the form of a powder. Further, it is common to employ a process which comprises reacting polyvinyl alcohol and an aldehyde in an aqueous solution in the presence of an acid catalyst till the desired final acetalization degree in one step, neutralizing the obtained resin slurry with an alkali, followed by dehydration, washing and then drying to obtain it in the form of a powder.

In such a case, an alkali neutralizing agent such as sodium hydroxide used for neutralization, will react with the acid catalyst to form a metal salt. Such a metal salt, an unreacted alkali neutralizing agent and an unreacted acid catalyst (hereinafter referred to as metal components) will be taken into particles of the polyvinylacetal resin or will deposit on the surface of particles of the resin. Such metal (alkali) components may be removed to some extent by repeating washing with water, but usually, it is difficult to remove metal components taken into particles of the resin.

A metal component remaining in the resin, such as an alkali metal is likely to impair the characteristics of the polyvinylacetal resin, such as the transparency, moisture resistance, electrical insulating properties, etc. and thus brings about a problem from the viewpoint of the product quality especially in an application to a molded product for which a high level of transparency or moisture resistance is required or to an adhesive for electronic materials for which electrical insulating properties are required. Thus, an improvement is required in this respect. In order to solve such a quality problem of the transparency, moisture resistance, electrical insulating properties, etc. caused by an alkali, various proposals have been made from the viewpoint of the reaction scheme or the production method. For example, there are a method of adding an alkylene oxide when the predetermined acetalization degree has been reached, to let it reacted with the remaining acid catalyst to terminate the acetalization reaction (e.g. JP-A-4-55404), a method of carrying out the acetalization reaction and precipitation with vigorous stirring (e.g. JP-A-11-349629), a method of employing a loop-shaped reactor (e.g. JP-A-5-59117), a method of employing a reactor having a flat smooth surface (e.g. JP-A-4-275310), a method of employing a reactor made of a corrosion-resistant material (e.g. JP-A-5-140216), a method of neutralizing the reaction product slurry while applying ultrasonic vibration (e.g. JP-A-5-97919) and a method of precipitating the reaction product slurry in a powder form, followed by purification by electrodialysis (e.g. JP-A-2000-38456).

Further, the polyvinylacetal resin is likely to adhere various materials such as metals, plastics or glass, and in its production in an industrial scale, it tends to stick to the interior of the reactor or pipings, which tends to cause a serious technical problem.

With a polyvinylbutyral resin synthesized by a conventional process, it has not been sufficient to remove a metal component in the resin by washing, and a polyvinylacetal resin which is excellent in removability of a metal component by washing and which has a low content of a metal component, and a process for its production, have been desired. Further, a production process free from sticking in the interior of the reactor or pipings, has been desired. The present inventors have conducted a research and development to meet with such demands, and as a result, have found a polyvinylacetal resin which is excellent in the removability by washing of an alkali metal component such as sodium remaining in the resin and which scarcely sticks to the production equipment such as a reactor or pipings and has a low content of a metal component, and a process for its production. The present invention has been accomplished on the basis of these discoveries.

DISCLOSURE OF THE INVENTION

The present invention is characterized by having the following gists.

1. A polyvinylacetal resin characterized in that it is obtained by reacting polyvinyl alcohol and an aldehyde in the presence of an acid catalyst, and it has an acetalization degree of at least 60 mol % and a specific surface area of from 1.50 to 3.50 $m^2/g$.
2. The resin according to 1, which has a bulk density of from 0.12 to 0.19 $g/cm^3$.
3. The resin according to 1 or 2, which has an average particle diameter of from 0.5 to 2.5 μm.
4. The resin according to 1, 2 or 3, which has a metal content of at most 80 ppm.
5. A process for producing a polyvinylacetal resin, characterized by feeding a reaction fluid containing polyvinyl alcohol, an aldehyde and an acid catalyst into a first reactor, to carry out an acetalization reaction, discharging the reaction fluid wherein the acetalization degree has reached from 10 to 60 mol %, and feeding the same into a second reactor to carry out a further reaction to bring the acetalization degree of polyvinylacetal to at least 65 mol %.
6. The process for producing a polyvinylacetal resin according to 5, wherein the first reactor is a closed reactor provided with a stirring mechanism.
7. The process for producing a polyvinylacetal resin according to 5 or 6, wherein the reaction temperature in the first reactor is within a range of from 10 to 60° C.
8. A process for producing a polyvinylacetal resin, characterized by comprising steps of continuously feeding polyvinyl alcohol, an aldehyde and an acid catalyst into a closed reactor, to carry out an acetalization reaction, and continuously discharging a reaction product wherein the acetalization degree of polyvinylacetal formed, has reached at least 10 mol %, out from the closed reactor.
9. The process according to 8, which comprises steps of further aging and reacting the reaction product continuously discharged out from the closed reactor, in a separate reactor, and after the acetalization degree of polyvinylacetal has reached at least 60%, subjecting this polyvinylacetal to neutralization, washing with water, dehydration and drying.

10. The process according to 8 or 9, wherein the reaction temperature in the closed reactor is within a range of from 20 to 50° C.

11. A process for producing a polyvinylacetal resin, characterized by continuously or intermittently feeding a reaction fluid containing polyvinyl alcohol, an aldehyde and an acid catalyst into a reactor, to carry out an acetalization reaction, so that the average retention time of the reaction fluid in the reactor would be at least 30 minutes, and continuously or intermittently discharging the reaction fluid wherein the acetalization degree has reached at least 10 mol % and less than 65 mol %, out from the reactor.

12. The process according to 11, wherein the reaction fluid continuously or intermittently discharged out from the reactor, is further reacted in a separate reactor, to bring the acetalization degree of polyvinylacetal to at least 65%.

13. The process according to 11 or 12, wherein the reactor is a closed reactor provided with a stirring mechanism.

14. The process according to 11, 12 or 13, wherein the reaction temperature in the reactor is within a range of from 20 to 50° C.

15. A process for producing a polyvinylacetal resin, which comprises reacting polyvinyl alcohol and an aldehyde in the presence of an acid catalyst, characterized by feeding polyvinyl alcohol, an aldehyde and an acid catalyst into a reactor of a first reaction apparatus to carry out an acetalization reaction, discharging a first reaction fluid wherein the acetalization degree has reached at least 10 mol % from the reactor of the first reaction apparatus, and then feeding this first reaction fluid into a second reaction apparatus having one reactor or two or more reactors connected in series to carry out aging and a reaction to bring the acetalization degree to at least 60 mol %.

16. The process according to 15, wherein at least one reactor among the reactors of the first reaction apparatus and the second reaction apparatus is a closed reactor provided with a stirring mechanism.

17. The process according to 15 or 16, wherein the average retention time of the reaction fluid in the reactor of the first reaction apparatus is at least 1 minute.

18. The process according to any one of 15 to 17, wherein the total of the average retention times of the reaction fluid in the reactors of the second reaction apparatus satisfies the following formula:

$$\epsilon Vi/Q \geq 1$$

where the total number of reactors of the second reaction apparatus is N (number), Vi is the volume (liters) of the i-th reactor in the second reaction apparatus, i is an integer of from 1 to N, $\epsilon Vi$ is the total of the volumes of the respective reactors of the second reaction apparatus, and Q is the amount per unit time (liters/hr) of the first reaction fluid flowing into the second reaction apparatus.

19. A process for producing a polyvinylacetal resin, which comprises reacting polyvinyl alcohol and an aldehyde in the presence of an acid catalyst, characterized by comprising steps of preliminarily charging water or an aqueous solution having an acid catalyst dissolved therein into a reactor, then feeding polyvinyl alcohol, an aldehyde and an acid catalyst to the reactor, then stopping the feeding of the raw materials, and then carrying out an acetalization reaction and an aging reaction in the reactor to bring the acetalization degree of polyvinylacetal to at least 60 mol %.

20. The process according to 19, wherein the volume of the water or the aqueous solution having an acid catalyst dissolved therein, preliminarily charged into the reactor, and the volume per unit time of the polyvinyl alcohol, the aldehyde and the acid catalyst, fed into the reactor, satisfy the following formula:

$$V/v \geq 0.5$$

where V is the volume (liters) of the water or the aqueous solution having an acid catalyst dissolved therein, preliminarily charged into the reactor, and v is the volume per unit time (liters/hr) of the polyvinyl alcohol, the aldehyde and the acid catalyst, fed into the reactor.

BRIEF DESCRIPTION OF THE DRAWING

FIG. 1 is a view schematically illustrating the relation between the first reaction apparatus and the second reaction apparatus in one embodiment of the present invention. Here, in Fig, the method of feeding raw materials into the reactor of the first reaction apparatus and the method of feeding the reaction fluid into the reactor of the second reaction apparatus, are shown to be a system wherein the material is fed from a lower portion of the reactor and discharged from an upper portion of the reactor.

EXPLANATION OF SYMBOLS

10: First reaction apparatus
11: Reactor of the first reaction apparatus
12: Aqueous polyvinyl alcohol solution
13: Butyl aldehyde
14: Hydrochloric acid
15: First reaction fluid
16: Second reaction fluid
20: Second reaction apparatus
21: First reactor of the second reaction apparatus
22: Second reactor of the second reaction apparatus
23: Nth reactor of the second reaction apparatus

MODE FOR CARRYING OUT THE INVENTION

Now, the present invention will be described in detail. In the following description, "parts" and "%" are represented as based on mass unless otherwise specified.

The polyvinylacetal resin in the present invention is characterized in that it is preferably a porous powder which is obtainable by reacting polyvinyl alcohol and an aldehyde in the presence of an acid catalyst and which has an acetalization degree of at least 60 mol %, preferably at least 65 mol % and a large specific surface area. The polyvinylacetal resin of the present invention has a specific surface area of the resin as measured by a mercury injection method within a range of from 1.5 to 3.5 $m^2/g$, preferably from 1.7 to 3.0 $m^2/g$. If it is less than 1.5 $m^2/g$, such will be close to the characteristics of a common polyvinylacetal resin, and if it exceeds 3.5 $m^2/g$, the resin tends to float, whereby loss tends to increase in the washing or dehydration step, such being undesirable. The specific surface area was measured by the following procedure under the following conditions by means of an automatic porosimeter autopore IV500, manufactured by Shimadzu Corporation. Firstly, about 0.6 g of a sample was taken into a sample cell, weighed and then set in an apparatus. Then, it was subjected to vacuum evacuation treatment to 50 μg (6.7 Pa) in the apparatus and then measured. The measurement was carried out under such conditions that the mercury injection pressure was 1 psia (6900 Pa), the maximum mercury head pressure was 44500 psia (290 MPa), and the equilibrium time was 10 seconds.

Further, the bulk density of the polyvinylacetal resin of the present invention is preferably from 0.12 to 0.19 g/cm$^3$, particularly preferably from 0.14 to 0.17 g/cm$^3$. The bulk density was measured in the following procedure. Into a measuring cylinder having a capacity of 200 mL and a preliminarily known weight, the powder of the polyvinylacetal resin was put, and after adjusting the top surface accurately, the weight was measured. The difference in weight (the weight of the powder present in the measuring cylinder) was divided by the volume (200 mL) of the measuring cylinder to obtain the bulk density.

The average particle diameter of the polyvinylacetal resin of the present invention is preferably from 0.5 to 2.5 μm, particularly preferably from 0.8 to 2 μm. The primary particle diameters were measured with respect to at least particles of n=at least 20 on the basis of a scanning electron microscopic photograph taken under 5000 magnifications, and an average particle diameter is calculated from these measured results.

The polyvinylacetal resin of the present invention has a large specific surface area and is excellent in removability of a metal component by washing, and accordingly, the content of a metal component (particularly an alkali metal such as sodium) is very low at a level of at most 80 ppm, particularly preferably at most 60 ppm. Accordingly, it is excellent in moisture resistance, transparency, electrical insulating properties, etc., and thus can be suitably used as a raw material resin for various coating materials, adhesives, binders or molded products. To the polyvinylacetal resin of the present invention, a plasticizer, a lubricant, a filler, a stabilizer, etc. may suitably selectively be added. As a method of incorporating additives, an optional method may be employed which is commonly used in the resin processing field. For example, a closed mixer such as mixing roll or a kneader, or an extruder having a kneading function may be used.

The powder of the polyvinylacetal resin of the present invention is preferably produced as follows.

As the polyvinyl alcohol as the raw material to be used in the present invention, one having an average degree of polymerization of from 200 to 4000 and saponification degree of at least 80%, is used. Further, in the present invention, the polyvinyl alcohol is used in the form of a 3 to 15% aqueous solution, preferably a 5 to 12% aqueous solution, in order to feed it continuously and constantly into the reactor.

The aldehyde as the second raw material to be used in the present invention, may be an aldehyde which is commonly used as a raw material for the synthesis of a polyvinylacetal resin. For example, it may be an aliphatic aldehyde such as formaldehyde, acetaldehyde, propionaldehyde, n-butyl aldehyde, tert-butyl aldehyde, amyl aldehyde, hexyl aldehyde or 2-ethylhexyl aldehyde, an alicyclic aldehyde such as cyclohexyl aldehyde or furfural, or an aromatic aldehyde, such as benzaldehyde, an alkyl-substituted benzaldehyde or a halogen-substituted benzaldehyde, or a phenyl-substituted alkylaldehyde. Among them, acetaldehyde or butyl aldehyde is preferably employed. These aldehydes may be used alone or in combination as a mixture of two or more of them.

As the acid catalyst to be used in the present invention, hydrochloric acid, phosphoric acid, sulfuric acid, citric acid and p-toluene sulfonic acid may, for example, be used alone or in combination as a mixture of two or more of them. Such an acid catalyst is added usually in a suitable amount so that the pH of the reaction fluid will be from 0.3 to 2.0.

Specifically, the polyvinylacetal resin in the present invention may be produced by the following preferred embodiments (a) to (d).

(a) In this embodiment, polyvinyl alcohol, an aldehyde and an acid catalyst are continuously fed into a closed reactor to carry out an acetalization reaction, and after the acetalization degree has reached at least 10%, the reaction product is continuously discharged, and then aged and reacted in a separate reactor, followed by neutralization, washing with water, dehydration and drying.

Namely, this embodiment is characterized in that three raw materials i.e. polyvinyl alcohol, an aldehyde and an acid catalyst, are fed into a closed reactor provided with an inlet for the raw materials, and after the acetalization degree after the initiation of the reaction, has reached at least 10 mol %, the reaction fluid is discharged continuously out from the reactor.

By continuously discharging the reaction fluid out of the reaction system in such a manner, the product formed by the reaction (hereinafter referred to as the reaction product) will be one having high porosity. Further, by transferring the reaction fluid to a reactor for aging to complete the reaction, it is possible to obtain a polyvinylacetal resin which has a porosity heretofore not available and which is excellent in removability of a metal component by washing.

The method of feeding the raw materials is not particularly limited, and it is possible to employ ① a method of feeding the three types from separate inlets respectively, ② a method of preliminarily mixing the polyvinyl alcohol and the acid catalyst and then feeding the aldehyde and the mixed fluid of the polyvinyl alcohol and the acid catalyst, separately from inlets, or ③ a method of preliminarily mixing the polyvinyl alcohol and the aldehyde, and then feeding the acid catalyst and the mixed fluid of the polyvinyl alcohol and the aldehyde, separately from inlets. Among them, ① or ② is preferred from the viewpoint of the control of the reaction.

Discharging of the reaction product from the reactor is carried out continuously. In such a case, it is preferred to use a reactor and piping having smooth surface finish applied to a welded portion between the piping and the reactor or to the inner wall of the piping so that the reaction product will not locally or macroscopically stay in the vicinity of the discharge outlet of the reactor or in the discharge piping. More specifically, preferred is, for example, a method of feeding the raw materials from an upper portion of the reactor and continuously discharging the reaction product from a lower portion of the reactor, a method of feeding the raw materials to a lower portion of the reactor by means of a supply tube from an upper portion of the reactor and continuously discharging the reaction product from the upper portion of the reactor, or a method of feeding the raw materials from a lower portion of the reactor and continuously discharging the reaction product from an upper portion of the reactor. Further, a method wherein water is preliminarily filled in the reactor and then the raw materials are fed, is effective as a method to prevent pooling of air in the reactor.

The reactor is preferably a known tank type reactor provided with a stirring mechanism, or a tubular reactor, with a view to reacting the three types of raw materials in a homogeneous system. As the stirring condition, with a view to accomplishing sufficient stirring, it is preferred to carry out the stirring with a stirring power per unit volume of at least 0.4 kW/m$^3$.

As stirring vanes to be used for stirring the reaction fluid in the reactor, conventional ones may be used. For example, three-bladed swept back vanes, paddle vanes, anchor vanes, max blend vanes and full zone vanes may be mentioned. With a view to accomplishing sufficient mixing, it is preferred to use so-called large size vanes such as max blend vanes or full zone vanes.

Usually, the reaction temperature for the acetalization reaction is set within a range of from 0 to 90° C. However, usually, it is not common to carry out the acetalization reaction in the vicinity of the center of this range (20 to 50° C.). It is rather common to carry out the reaction at a low temperature of at most 10° C. or, inversely and intentionally, at a high temperature of at least 60° C., in order to obtain a resin excellent in washing properties. On the other hand, in the present invention, for the acetalization reaction, a temperature of from 10 to 60° C., preferably from 20 to 50° C., particularly preferably from 25 to 45° C., is selected. It is also one of characteristics of the present invention that by such a reaction at an intermediate temperature of from 20 to 50° C., it is possible to obtain a porous resin (having a large specific surface area) having good washing properties, which is excellent in washability of a metal component, and whereby the content of the metal component in the resin can relatively easily be lowered to the desired concentration.

In the present invention, the reaction time, i.e. the time during which the raw materials fed into the reactor remain in the reactor until they are discharged (the average retention time), is also characteristic. This reaction time is selected for every reaction temperature condition so that the acetalization degree will be at least 10 mol %, preferably at least 15 mol %, further preferably at least 20 mol %. Depending upon the reaction temperature, the time until the desired acetalization degree will be reached, varies, but as an index, it may be selected within a range of from 10 seconds to 7 minutes.

The reaction product discharged from the reactor is then transferred to another reactor to carry out an aging reaction. The reaction temperature for the aging is within a range of from room temperature to 90° C., preferably from 30 to 70° C., and the reaction time is set so that the acetalization reaction reaches and completes to a desired acetalization degree and is usually set within a range of from 1 to 24 hours, preferably from 1 to 10 hours. The acetalization degree desired by this aging reaction is selected to be at least 60 mol %, preferably at least 65 mol %.

The aging reaction product (slurry) thus obtained exhibits acidity due to the acid catalyst. To neutralize this slurry, an alkali neutralizing agent such as sodium hydroxide or sodium bicarbonate will be added. Usually, the pH is adjusted to be from 7 to 11.

Then, dehydration and washing with water are repeated to remove the metal component remaining on the surface or void spaces of the powder. In addition, the remaining acid catalyst and the reaction residues such as the aldehyde, will also be removed. Such washing with water is carried out at a temperature of from room temperature to 60° C. Usually, the temperature is preferably at least 40° C., but the resin powder obtained by the present invention has a large specific surface area and thus has sufficient washability even by washing with water at room temperature.

The drying method is not particularly limited. For example, a known method such as a vacuum drying method or a hot air circulating drying method, may be employed.

(b) In this embodiment, polyvinyl alcohol, an aldehyde and an acid catalyst are continuously or intermittently fed into a reactor to carry out an acetalization reaction, and a reaction fluid wherein the acetalization degree has reached at least 10 mol % and less than 65 mol %, is continuously or intermittently discharged and then subjected to an aging reaction in another reactor, followed by neutralization, washing with water, dehydration and drying to obtain the resin.

Namely, the volume of the reactor and the volume of the raw materials to be fed per unit time, are selected so that the average retention time of the reaction fluid in the reactor will be preferably at least 30 minutes, and the reaction fluid containing the polyvinyl alcohol, the aldehyde and the acid catalyst in the reactor, is continuously or intermittently discharged out from the reactor. Here, the average retention time is represented by V/v where V is the volume (liters) of the reactor, and v is the volume per unit time (liters/min) of the raw materials fed. Namely, by continuously or intermittently discharging the reaction fluid from the reaction system under a certain condition in this manner, the reaction product (hereinafter referred to as the reaction fluid) will have a remarkable porosity, i.e. a specific surface area of particles being at least 1.5 $m^2/g$, and sticking to the interior of the reactor will be substantially reduced.

The method of feeding the raw materials is not particularly limited, and the same method as disclosed in the above (a) can be adopted, and method ① or ② is preferred from the viewpoint of the control of the reaction.

Discharging of the reaction product from the reactor is carried out continuously, and the same reactor, piping, system, etc. as disclosed in the above (a) may be used. Further, in a case where an open type reactor having a gas-liquid interface at the top of the reaction fluid, is employed, it is possible to use, for example, a method of feeding the raw materials from a lower portion of the reactor and discharging the reaction fluid from the side of the reactor, or a method of feeding the raw materials from an upper portion of the reactor and discharging the reaction fluid from a lower portion of the reactor so that the reaction fluid level will be constant.

With a view to reacting the three types of raw materials in a homogeneous system, the reactor is preferably a tank type reactor provided with a stirring mechanism, or a tubular reactor, and as a stirring condition, with a view to accomplishing proper mixing, it is preferred to carry out the stirring with a stirring power per unit volume of at least 0.05 $kW/m^3$. Particularly in a case where an open-type reactor is employed, it is preferred to carry out stirring at a relatively low rotational speed with little change of the liquid surface, with a view to suppressing sticking at the gas-liquid interface of the reaction fluid.

As stirring vanes to be used for stirring the interior of the reactor, those exemplified in the above (a) may be employed. Particularly with a view to reducing sticking of the resin to the stirring vanes or the stirring shaft, it is preferred to employ a lower portion stirring system. Further, with a view to reducing sticking of the resin to a baffle, a lower baffle system is preferred. The reaction temperature for the acetalization reaction is preferably from 20 to 50° C., as disclosed in the above (a), whereby a resin having good washability can be obtained.

Next, in the present invention, the average retention time, i.e. the average time during which the raw materials fed into the reactor remain in the reactor until they are discharged, is important. The volume of the reactor and the volume per unit time of the raw materials to be fed, are set so that the average retention time will be at least 30 minutes, preferably at least 45 minutes, more preferably at least 60 minutes. Further, the polyvinylacetal resin of the present invention can be obtained when the average retention time is set to be at least 30 minutes. It is undesirable from the viewpoint of the production efficiency to prolong the average retention time unnecessarily (e.g. at least two hours). The acetalization degree of the reaction fluid discharged is preferably at least 10 mol %, preferably at least 40 mol %, more preferably at least 55 mol % and less than 65%, although it may vary depending upon the reaction temperature.

The reaction fluid (slurry) discharged from the reactor is then transferred to another reactor to carry out an aging reaction. The aging reaction temperature, time and desired acetalization degree are the same as disclosed in the above (a). The treatment for neutralization of the slurry thus obtained, the treatment for removing a metal component by dehydration and washing with water, and the drying method, are also the same as disclosed in the above (a).

It is also one of the characteristics of this production process that sticking of the resin in the interior of the reactor, the stirring vanes and the interior of the piping, is scarce. The sticking state in the reactor was judged by visual observation by disassembling the reactor after completion of the reaction. Further, the deposits on the inner surface of the reactor, on the stirring vanes and stirring shaft and on the baffle, were peeled off in their entire amount, and the total weight was measured.

(c) In this embodiment, an aqueous polyvinyl alcohol solution, an aldehyde and an acid catalyst are preferably continuously fed to a reactor of a first reaction apparatus to carry out an acetalization reaction so that the acetalization degree of a first reaction fluid will be at least 10 mol %, and the first reaction fluid is preferably continuously discharged from the reactor of the first reaction apparatus. Then, the first reaction fluid is preferably continuously fed into a reactor of a second reaction apparatus having one reactor or two or more reactors connected in series, to carry out an aging reaction to form a second reaction fluid in which the acetalization degree is at most 60 mol %, and then the second reaction fluid is preferably continuously discharged from the second reaction apparatus.

Namely, here, firstly, in the first reaction apparatus, the aqueous polyvinyl alcohol solution, the aldehyde and the acid catalyst are preferably continuously fed into the reactor provided with an inlet to feed the raw materials to carry out the acetalization reaction so that the acetalization degree will be at least 10 mol %, and the first reaction fluid is preferably continuously discharged from the reactor of the first reaction apparatus.

The method of feeding the aqueous polyvinyl alcohol solution, the aldehyde and the acid catalyst into the reactor of the first reaction apparatus, is not particularly limited, and it is possible to employ, for example, ① a method of feeding the aqueous polyvinyl alcohol solution, the aldehyde and the acid catalyst from three inlets separately, ② a method of preliminarily mixing the polyvinyl alcohol and the acid catalyst and then feeding the aldehyde and the mixed fluid of the polyvinyl alcohol and the acid catalysts, from separate inlets, or ③ a method of preliminarily mixing the polyvinyl alcohol and the aldehyde, and then feeding the acid catalyst and the mixed fluid of the polyvinyl alcohol and the aldehyde, from separate inlets. Among them, from the viewpoint of the control of the reaction, the methods ① and ② are preferred.

Discharging of the first reaction fluid from the reactor of the first reaction apparatus is carried out preferably continuously. In such a case, it is preferred to use the reactor and piping having smooth surface finish applied to a welded portion of the piping and the reactor or to the inner wall of the piping, so that the reaction fluid will not stay locally or macroscopically in the vicinity of the discharge outlet of the reactor or in the discharge piping. As the method for feeding or discharging, it is preferred to employ ① a method of feeding the raw materials from an upper portion of the reactor of the first reaction apparatus and discharging the reaction fluid from a lower portion of the reactor, ② a method of feeding the raw materials into a lower layer portion of the reactor of the first reaction apparatus by means of a supply tube from an upper portion of the reactor of the first reaction apparatus and discharging the reaction fluid from an upper portion of the reactor of the first reaction apparatus, or ③ a method of supplying the raw materials from a lower portion of the reactor of the first reaction apparatus and discharging the reaction fluid from an upper portion of the reactor of the first reaction apparatus. Further, a method of preliminarily filling water into the reactor of the first reaction apparatus and then feeding the raw materials, is effective as a method to prevent pooling of air in the reactor.

The reactor of the first reaction apparatus is preferably a tank type closed reactor provided with a stirring mechanism for the purpose of uniformly mixing the polyvinyl alcohol, the aldehyde and the acid catalyst to be fed and suppressing sticking of the obtained first reaction fluid on the inner wall of the reactor. As a stirring condition, with a view to accomplishing sufficient mixing, it is preferred to adjust the stirring power per unit volume to be at least 0.4 kW/m$^3$.

As stirring vanes to be used for stirring the first reaction fluid in the reactor of the first reaction apparatus, those exemplified in the above (a) may be used. Further, the reaction temperature for the acetalization reaction is preferably from 20 to 50° C., as mentioned in the above (a), whereby a resin having good washability can be obtained.

The reaction time of the first reaction fluid in the reactor of the first reaction apparatus, i.e. the time until the raw materials fed into the reactor will be discharged as the first reaction fluid (the average retention time), is set to be at least one minute, preferably at least 1.5 minutes, although it depends on the reaction temperature. By securing such an average retention time, the acetalization reaction will proceed in the reactor of the first reaction apparatus, and the reaction product can be discharged as the first reaction fluid.

Then, the first reaction fluid continuously discharged from the first reaction apparatus is preferably continuously fed into the second reaction apparatus having one reactor or two or more reactors connected in series, to carry out the aging reaction, so that the acetalization degree of the second reaction fluid in the second reaction apparatus will be at least 60 mol %, preferably at least 65 mol %, and the second reaction fluid is preferably continuously discharged from the second reaction apparatus.

In order to facilitate the aging reaction, it is preferred to set the reaction temperature high, but sticking on the inner wall of the reactor is likely to be thereby caused. Accordingly, from the viewpoint of the aging reaction rate and the suppression of such sticking, the temperature in the reactor of the second reaction apparatus is usually from room temperature to 70° C., preferably from 30 to 60° C., more preferably from 35 to 55° C.

In the present invention, the aging reaction in the reactor of the second reaction apparatus is preferably continuously carried out. It is so designed that the aging reaction time, i.e. the total of the average retention times in the respective reactors of the second reaction apparatus, will satisfy the following relation.

$$\epsilon Vi/Q \geq 1$$

wherein in the above formula, Q is the amount per unit time (liters/hr) of the first reaction fluid, the total number of reactors in the second reaction apparatus is N (number), Vi is the volume (liters) of the i-th reactor in the second reaction apparatus, i is an integer of from 1 to N, and $\epsilon Vi$ is the total of the respective volumes of the reactors in the second reaction apparatus.

Namely, the volumes and the number of the reactors in the second reaction apparatus are determined so that the total of the respective average retention times in the reactors in the second reaction apparatus (i.e. the aging reaction time) will be at least one hour. For example, in a case where the amount fed into or discharged from the reactor in the second reaction apparatus is 30 liters/hr, it is possible to employ one reactor in the second reaction apparatus, having an internal capacity of 30 liters or two reactors in the second reaction apparatus, each having an internal capacity of 15 liters, or three reactors in the second reaction apparatus, each having an internal capacity of 10 liters, or five reactors in the second reaction apparatus, each having an internal capacity of 6 liters. In a case where a large size of a reactor in the second reaction apparatus to be used for the aging reaction is problematic, if the process of the present invention is used, it is possible to secure a predetermined aging reaction time by using a plurality of reactors having small internal capacities, whereby merits are substantial, such as compact installation and increase in the freeness in design.

The reactors of the second reaction apparatus to carry out the aging reaction are preferably closed tank type reactors provided with a stirring mechanism with a view to reacting the first reaction fluid fed into the reactors of the second reaction apparatus in a uniform state and with a view to preventing sticking to the inner walls of the reactors. Further, the method of feeding the reaction fluid to a reactor in the second reaction apparatus or discharging the reaction fluid from a reactor in the second reaction apparatus, may preferably be ① a method of feeding the reaction fluid from an upper portion of the reactor in the second reaction apparatus and discharging the reaction fluid continuously from a lower portion of the reactor, ② a method of feeding the reaction fluid to a lower portion of the reactor by means of a supply tube from an upper portion of the reactor in the second reaction apparatus and continuously discharging the reaction fluid from an upper portion of the reactor, or ③ a method of feeding the reaction fluid from a lower portion of the reactor in the second reaction apparatus and continuously discharging the reaction fluid from an upper portion of the reactor.

The reaction fluid (slurry) discharged via the reactors of the second reaction apparatus exhibits acidity due to the acid catalyst. In order to neutralize this reaction fluid, an alkali neutralizing agent such as sodium hydroxide or sodium bicarbonate, will be added. Usually, the pH is adjusted to be from 7 to 11.

The method of neutralizing the slurry may, for example, be a continuous neutralizing method wherein a suitable amount of alkali is continuously added to the slurry discharged from the second reaction apparatus, or a batch system neutralizing method wherein the slurry discharged is once stored in a tank, and then, a suitable amount of alkali is added with stirring.

Next, the treatment for removing a metal component by dehydration and washing with water of the slurry thus obtained, and the drying method, are the same as those disclosed in the above (a).

(d) In this embodiment, water or an aqueous solution having an acid catalyst dissolved therein, is preliminarily charged into a reactor, then polyvinyl alcohol, an aldehyde and an acid catalyst are fed, then feeding of the raw materials is stopped, and an acetalization reaction is carried out in the reactor, so that the acetalization degree of polyvinylacetal is adjusted to be at least 60 mol %.

Namely, there are characteristics in the apparatus and method for reacting polyvinyl alcohol, an aldehyde and an acid catalyst as raw materials for the polyvinylacetal resin. Firstly, it is preferred to satisfy the following formula:

$$V/v \geq 0.5$$

where V is the charged amount (liters) of the water or the aqueous solution having an acid catalyst dissolved therein, and v is the total volume per unit time (liters/hr) of the three types of the raw materials fed.

By satisfying the above formula, sticking on the wall, of the polyvinylacetal resin formed at the initial stage of the reaction in the reactor, can be suppressed. Then, in a stirred state, the polyvinyl alcohol, the aldehyde and the acid catalyst are continuously fed to fill the reactor, or before that, feeding of the raw materials is stopped when the desired liquid level is reached, and then the acetalization reaction and aging reaction are carried out in the reactor, so that the acetalization degree will reach at least 60 mol %.

The method of feeding the aqueous polyvinyl alcohol solution, the aldehyde and the acid catalyst into the reactor is not particularly limited, and it is possible to employ ① a method of separately feeding the aqueous polyvinyl alcohol solution, the aldehyde and the acid catalyst from three inlets, ② a method of preliminarily mixing the polyvinyl alcohol and the acid catalyst, and then feeding the aldehyde and the mixed fluid of the polyvinyl alcohol and the acid catalyst separately from the respective inlets, and ③ a method of preliminarily mixing the polyvinyl alcohol and the aldehyde, and then feeding the acid catalyst and the mixed fluid of the polyvinyl alcohol and the aldehyde, separately from the respective inlets. Among them, from the viewpoint of the control of the reaction, the method ① or ② is preferred.

The reactor to be used in the present invention is preferably a tank type reactor provided with a stirring mechanism, or a tubular reactor, with a view to reacting the aqueous polyvinyl alcohol solution, the aldehyde and the acid catalyst, thus fed, in a homogeneous system. Further, as the reactor, a reactor such as a full liquid type reactor or an open type reactor having a gas-liquid interface, may be used. As the stirring condition, it is preferred to carry out the stirring with a stirring power per unit volume of at least 0.05 kW/m$^3$ with a view to accomplishing a proper mixing.

As stirring vanes to be used for stirring the reaction fluid in the reactor, those exemplified in the above (a) may be used. As the stirring system, with a view to suppressing sticking to the stirring vanes and the stirring shaft, a lower stirring system is preferred. Further, also with respect to a baffle, a lower baffle system is preferred with a view to suppressing the sticking.

In the present invention, the polyvinyl alcohol, the aldehyde and the acid catalyst are fed continuously or intermittently to fill the reactor, or the feeding is stopped before that when the desired liquid level has been reached, and the acetalization reaction is carried out with stirring.

On the other hand, the reaction temperature for the acetalization reaction is preferably from 20 to 50° C., as mentioned in the above (a), whereby a resin having good washability, can be obtained. The reaction time is selected within a range of from 10 minutes to 10 hours, preferably from 30 minutes to 4 hours.

Then, the reaction fluid (slurry) discharged from the reactor is transferred to another reactor to carry out an aging reaction. The aging reaction temperature, time and desired acetalization degree are the same as disclosed in the above (a). The treatment for neutralization of the slurry thus obtained, the treatment for removing metal by dehydration and washing with water, and the drying method are also the same as those disclosed in the above (a).

Now, the present invention will be described in further detail with reference to Examples, but it should be understood that the present invention is by no means restricted to the following Examples.

EXAMPLE a1

An aqueous polyvinyl alcohol solution as one of the raw materials, was prepared in the following manner. Into a 30 liter SUS dissolution tank, 9000 parts of pure water and 1000 parts of polyvinyl alcohol having an average polymerization degree of 1700 and a saponification degree of 98 mol %, were put and heated to completely dissolve the polyvinyl alcohol.

A cylindrical closed reactor made of glass and having a capacity of 2 liters, which has three inlets at a lower portion of the reactor and has one discharge outlet at an upper portion of the reactor, was ready. Into the reactor, pure water was filled, and the internal temperature was maintained at 30° C. with stirring (anchor vanes, 400 rpm). During the reaction, the stirring state was maintained. Then, the above-mentioned 10% polyvinyl alcohol aqueous solution, 35% hydrochloric acid as an acid catalyst, and butyl aldehyde (purity: 99.5%) as an aldehyde, were made ready and then fed from a lower portion of the reactor, so that the respective supply rates would be 60 kg/hr, 1.9 kg/hr and 4.5 kg/hr, respectively, to carry out the acetalization reaction. After the acetalization degree of the formed polyvinylacetal reached at least 10 mol %, the reaction fluid was discharged from an upper portion of the reactor, while feeding the above-mentioned aqueous polyvinyl alcohol solution, hydrochloric acid and butyl aldehyde from a lower portion of the reactor.

The discharged reaction product (slurry) was transferred to a 10 liter aging tank separately made ready (the transported amount: 5 kg) and then aged at 50° C. for two hours. The stirring vanes of the aging tank were three-bladed sweptback vanes, and a condition of rotational speed for stirring of 250 rpm was employed. Further, the average retention time of the reactor at that time was two minutes, and the discharged fluid from the closed reactor was sampled and measured, whereby the butyralization degree at the outlet of the reactor was 41 mol %, and the butyralization degree after aging for two hours at 50° C., was 68 mol %.

Then, an aqueous sodium hydroxide solution was added to the slurry to adjust the pH to 8. After cooling to room temperature, this slurry was dehydrated by a centrifugal separator to a water content of 45%, and water in an amount of ten times to the resin content was added for dilution and stirred for 30 minutes for washing with water.

This operation of dehydration and washing with water, was repeated three times, and the obtained slurry was again dehydrated and then dried to obtain a polyvinylbutyral resin as a white powder. Further, the temperature of water employed for the washing with water was 25° C. in each case.

The butyralization degree of the obtained polyvinylbutyral resin was 68 mol %. The specific surface area per unit weight of the resin powder measured by means of an automatic porosimeter autopore IV9500, manufactured by Shimadzu Corporation, was 2.6 m$^2$/g. The content of sodium element in the resin, as measured by ICP emission elemental analysis, was 20 ppm.

The results of the butyralization degree of the product sampled at the outlet of the reactor, the butyralization degree of the finally obtained polyvinylbutyral resin, the specific surface area of the resin powder as measured by the porosimeter, the bulk density, the particle diameter and the amount of sodium in the resin measured by ICP, are summarized in Table 1.

EXAMPLE a2

The operation was carried out in the same manner as in Example a1 except that in Example a1, the temperature of the reactor was changed to 20° C. The butyralization degree of the reaction product sampled at the discharge outlet of the reactor was 19 mol %.

EXAMPLE a3

The operation was carried out in the same manner as in Example a1 except that in Example a1, the feeding rate of the three types of raw materials into the reactor was changed to twice (i.e. an average retention time of one minute). The butyralization degree of the reaction product sampled at the discharge outlet of the reactor, was 25 mol %.

EXAMPLE a4

The operation was carried out in the same manner as in Example a1 except that in Example a1, the method of feeding the three types of raw materials into the reactor was changed as follows.

Firstly, the 10% polyvinyl alcohol aqueous solution and 35% hydrochloric acid were preliminarily mixed in a predetermined ratio. This mixed fluid and butyl aldehyde were fed from two inlets at a lower portion of the reactor at rates of 61.9 kg/hr and 4.5 kg/hr, respectively, and the reaction fluid wherein the acetalization degree of polyvinylacetal formed, reached at least 10 mol %, was discharged from an upper portion of the reactor, while feeding the above polyvinyl alcohol solution, hydrochloric acid and butyl aldehyde from a lower portion of the reactor. The butyralization degree of the reaction product sampled at the discharge outlet of the reactor, was 39 mol %.

EXAMPLE a5

The operation was carried out in the same manner as in Example a4 except that in Example a4, the mixed fluid comprising the polyvinyl alcohol aqueous solution and 35% hydrochloric acid, was fed to a lower portion of the reactor via a nozzle inserted from an upper portion of the reactor (the forward end of the nozzle was set at a position of H/5 from the bottom where H is the height of the reactor), and the reaction fluid was discharged from a discharge outlet at an upper portion of the reactor.

The butyralization degree of the reaction product sampled at the discharge outlet of the reactor, was 35 mol %.

EXAMPLE a6

The operation was carried out in the same manner as in Example a4 except that in Example a4, the mixed fluid comprising the polyvinyl alcohol aqueous solution and 35% hydrochloric acid, and the butylaldehyde were fed from two inlets at an upper portion of the reactor, and the reaction product was discharged from the bottom of the reactor. The butyralization degree of the reaction product sampled at the discharge outlet of the reactor, was 37 mol %.

EXAMPLE a7

The operation was carried out in the same manner as in Example a4 except that in Example a4, max blend vanes (manufactured by Sumitomo Heavy Industries, Ltd., ratio of the vane width to the inner diameter of the reactor: 0.55) were used as the stirring vanes for the reactor.

The butyralization degree of the reaction product sampled at the discharge outlet of the reactor, was 43 mol %.

EXAMPLE a8

The operation was carried out in the same manner as in Example a4 except that in Example a4, two paddle vanes (ratio of the paddle width to the inner diameter of the reactor: 0.6) were used as the stirring vanes for the reactor, and the condition for the stirring speed was changed to 120 rpm.

The butyralization degree of the reaction product sampled at the discharge outlet of the reactor, was 35 mol %.

COMPARATIVE EXAMPLE a1

A glass reactor having an internal capacity of 2 liters which was similar to Example a1 but which had no inlet at a lower portion of the reactor, was made ready. A 10% polyvinyl alcohol aqueous solution, 35% hydrochloric acid and butylaldehyde were made ready under such a condition that the feeding amounts per unit time into the reactor would be the same ratio as in Example a1, i.e. 600 g, 19 g and 45 g, respectively. In a state where the stirring vanes of the reactor were rotated, the above three types of raw materials were added simultaneously from separate inlets at an upper portion of the reactor. Upon expiration of two minutes, the mixture was quickly transferred to a separate aging tank and then aged.

The butyralization degree of the reaction fluid sampled immediately after expiration of two minutes, was 49 mol %. Thereafter, the procedure of Example a1 was followed to finally obtain a polyvinylbutyral resin powder.

COMPARATIVE EXAMPLE a2

In Comparative Example a1, a mixed fluid comprising a 10% polyvinyl alcohol aqueous solution and 35% hydrochloric acid, was preliminarily prepared, and 619 g of this mixed fluid and 45 g of butylaldehyde were added.

EXAMPLE b1

An aqueous polyvinyl alcohol solution as one of the raw materials, was prepared as follows.

Into a 150 liter SUS dissolution tank, 90000 parts of pure water and 10000 parts of polyvinyl alcohol having an average polymerization degree of 1700 and a saponification degree of 98.5 mol %, were put and heated to completely dissolve the polyvinyl alcohol.

A cylindrical closed reactor made of glass and having a capacity of 9 liters (provided with two rod baffles) which had three inlets at a lower portion of the reactor and one discharge outlet at an upper portion of the reactor, was made ready. Pure water was filled into the reactor and the internal temperature was maintained at 32° C. with stirring (anchor vanes, 350 rpm).

The above-mentioned 10% polyvinyl alcohol aqueous solution, 35% hydrochloric acid as an acid catalyst and butylaldehyde (purity: 99.5%) as an aldehyde, were made ready. While feeding them from a lower portion of the reactor so that the respective feeding rates would be 9.0 kg/hr, 0.29 kg/hr and 0.68 kg/hr, the formed polyvinylacetal reaction fluid (slurry) was discharged from an upper portion of the reactor.

Feeding of the raw materials into the reactor was carried out for 5 hours, and then the feeding line of the polyvinyl alcohol aqueous solution was switched to pure water. The interior of the reactor was sufficiently substituted by pure water, and then, the reactor was disassembled, whereupon the sticking state on the inner surface of the reactor, the stirring vanes and the baffle was ascertained. As a result, no substantial sticking was observed on the inner surface of the reactor, on the stirring vanes or on the baffle, and the condition was good. The total weight of deposits sticking on the inner wall, the vanes, the shaft and the baffle, was 58 g.

The average retention time in the reactor under this condition was 60 minutes, and the acetalization degree of the formed polyvinylacetal sampled at the discharge outlet at the upper portion of the reactor, was 58 mol %. A part of the obtained slurry was transferred to a separate 6 liter aging tank (amount transferred: 3 kg) and then aged at 55° C. for two hours. The stirring vanes of the aging tank were three-bladed sweptback vanes, and a condition of the stirring rotational speed of 150 rpm was adopted.

Then, an aqueous sodium hydroxide solution was added to adjust the pH to 9. After cooling to room temperature, this slurry was dehydrated by a centrifugal separator to a water content of 45%, then diluted by an addition of water in an amount of ten times to the resin content and washed with water with stirring for 30 minutes.

This operation of dehydration and washing with water was repeated three times, and the obtained slurry was again dehydrated and then dried to obtain a white powdery polyvinylbutyral resin. Here, the temperature of water used for washing was 25° C. each time.

The butyralization degree of the obtained polyvinylbutyral resin was 70 mol %. The specific surface area per unit weight of the resin powder measured by means of automatic porosimeter autopore IV500, manufactured by Shimadzu Corporation, was 3.2 m$^2$/g.

The content of sodium element in the resin was 18 ppm as measured as an ICP emission elemental analysis.

The results of the butyralization degree of the reaction product sampled at the discharge outlet of the reactor, the butyralization degree of the finally obtained polyvinylbutyral resin, the thickness of the deposit sticking to the inner surface of the reactor, the specific surface area of the resin powder measured by a porosimeter, the particle size and the amount of sodium in the resin measured by ICP, are summarized in Table 2.

EXAMPLE b2

The operation was carried out under the same conditions as in Example b1, except that the temperature in the reactor was changed to 25° C.

EXAMPLE b3

In Example b1, the operation was carried out by adjusting the feeding rates of the polyvinyl alcohol aqueous solution, 35% hydrochloric acid and butylaldehyde to be 4.5 kg/hr, 0.145 kg/hr and 0.34 kg/hr, respectively (the average retention time: 120 minutes).

EXAMPLE b4

In Example b1, the operation was carried out by adjusting the feeding rates of the polyvinyl alcohol aqueous solution, 35% hydrochloric acid and butylaldehyde to be 2.25 kg/hr, 0.073 kg/hr and 0.17 kg/hr, respectively (the average retention time: 240 minutes), and at a reaction temperature of 37° C.

EXAMPLE b5

A tank type reactor made of glass and having a capacity of 9 liters, was made ready, and a glass nozzle having an inner diameter of 20 mm was attached at a position where the internal capacity would be 4 liters (side of the reactor). Three supply tubes were attached at three positions at an upper portion of the reactor, and via such supply tubes, three types of raw materials i.e. a 10% polyvinyl alcohol aqueous solution, 35% hydrochloric acid and butylaldehyde, were, respectively, fed from a lower portion of the reactor. The respective feeding rates were 6.0 kg/hr, 0.19 kg/hr and 0.45 kg/hr (the average retention time: 40 minutes). During the feeding, the internal temperature was maintained to be 45° C. with stirring (anchor vanes, 100 rpm). The formed polyvinylacetal reaction fluid was continuously discharged from the nozzle at the side of the reactor.

EXAMPLE b6

In Example b5, the operation was carried out by attaching the glass nozzle at a position where the internal capacity would be 6 liters (average retention time: 60 minutes).

EXAMPLE b7

In Example b5, the operation was carried out by attaching the glass nozzle at a position where the internal capacity would be 6 liters (average retention time: 60 minutes), and adjusting the feeding rates of the 10% polyvinyl alcohol aqueous solution, 35% hydrochloric acid and butylaldehyde to be 3.0 kg/hr, 0.095 kg/hr and 0.225 kg/hr, respectively (the average retention time: 120 minutes), and at a reaction temperature of 20° C.

EXAMPLE b8

In Example b7, the operation was carried out at a reaction temperature of 50° C.

COMPARATIVE EXAMPLE b1

A glass reactor having an internal capacity of 2 liters, which was similar to Example b1 but which has no inlet at a lower portion of the reactor, was made ready. A 10% polyvinyl alcohol aqueous solution, 35% hydrochloric acid and butylaldehyde were made ready under such conditions that the feeding volumes into the reactor per unit time would be in the same ratio as in Example b1, i.e. 900 g, 29 g and 68 g, respectively. In a state where the stirring vanes of the reactor were rotated, the above three types of raw materials were simultaneously added from separate inlets at an upper portion of the reactor. Upon expiration of 60 minutes, the mixture was transferred to a separate aging tank and then aged. The butyralization degree of the reaction fluid sampled immediately after expiration of 60 minutes, was 53 mol %.

Thereafter, the procedure of Example b1 was followed to finally obtain a polyvinylbutyral resin powder.

COMPARATIVE EXAMPLE b2

The operation was carried out under the same conditions as in Example b1, except that a cylindrical closed reactor made of glass and having a capacity of 2 liters (provided with two rod baffles) was employed. The average retention time in the reactor was about 13 minutes. After disassembling the reactor, the sticking state was observed, whereby sticking was substantial particularly on the baffle and anchor vanes. The total weight of the deposits was 210 g.

COMPARATIVE EXAMPLE b3

The operation was carried out under the same conditions as in Example b1, except that a cylindrical closed reactor made of glass and having a capacity of 4 liters (provided with two rod baffles) was employed. The average retention time in the reactor was about 26 minutes. After disassembling the reactor, the sticking state was observed, whereby sticking was observed on the baffle, anchor vanes and inner wall of the reactor. The total weight of the deposits was 107 g.

COMPARATIVE EXAMPLE b4

In Example b6, the operation was carried out at a reaction temperature of 5° C.

COMPARATIVE EXAMPLE b5

In Example b6, the operation was carried out at a reaction temperature of 65° C. Upon expiration of 14 minutes after initiation of feeding the raw materials, the discharge nozzle at the side of the reactor was clogged, and the reaction fluid was not constantly discharged. Therefore, the operation was stopped.

EXAMPLE c1

An aqueous polyvinyl alcohol solution was prepared as follows. Into a 600 liter SUS dissolution tank, 400000 parts of pure water and 40000 parts of polyvinyl alcohol having an average polymerization degree of 1700 and a saponification degree of 98.5 mol %, were put and heated to completely dissolve the polyvinyl alcohol.

As the reactor of the first reaction apparatus, a tank type closed reactor made of glass and having a capacity of 500 ml which had three inlets at a lower portion of the reactor and one discharge outlet at an upper portion of the reactor, was used. Pure water was filled into the reactor of the first reaction apparatus, and the internal temperature was maintained to be 30° C. with stirring (anchor vanes, 400 rpm).

Then, the above-mentioned polyvinyl alcohol aqueous solution, 35% hydrochloric acid as an acid catalyst, and butyl aldehyde (purity: 99.5%) as an aldehyde, were used and then fed from a lower portion of the reactor, so that the respective feeding rates would be 15 kg/hr, 0.5 kg/hr and 1.1 kg/hr, respectively, to carry out the acetalization reaction, and the first reaction fluid was continuously discharged from an upper portion of the reactor of the first reaction apparatus (the average retention time of the first reaction fluid in the reactor of the first reaction apparatus: about 1.8 minutes).

Then, the first reaction fluid was fed to a lower portion of the first reactor (outer temperature: 40° C., stirring with anchor vanes: 400 rpm) among three closed reactors made of glass and having an internal capacity of 15 liters (the reactors of the second reaction apparatus) disposed in series with the reactor of the first reaction apparatus, while the reaction fluid was discharged from an upper portion of the reactor and then carrying out feeding and discharging in a similar manner to a second reactor and a third reactor (the total of the average retention times of the three reactors of the second reaction apparatus: 2.7 hours) to continuously carry out an aging reaction in the reactors of the second reaction apparatus to finally have the second reaction fluid discharged from an upper portion of the third reactor of the second reaction apparatus.

The second reaction fluid (slurry) discharged from the reactor of the second reaction apparatus was stored in a tank of 500 liters. Then, an aqueous sodium hydroxide solution was added to the slurry to adjust the pH to 8.

After cooling to room temperature, this slurry was dehydrated by a centrifugal separator to a water content of 48%, and water was added in an amount of 15 times to the resin component, whereupon washing with water was carried out by stirring for 30 minutes.

This operation of dehydration and washing with water was repeated twice, and the obtained slurry was dehydrated again and then dried to obtain a white powdery polyvinyl-butyral resin. Here, the temperature of water to be used for washing with water was 25° C. in each case.

The content of sodium element in the resin as measured by an ICP emission elemental analysis, was 13 ppm. Here, the specific procedure of the ICP analysis was as follows. 0.5 g of the polyvinylbutyral resin and 5 ml of nitric acid were put into a microwave decomposition container (inner cylinder) and decomposed by a microwave decomposition apparatus (MLS-1200MEGA, manufactured by Milestone). After cooling, the entire decomposition container was dried up in a water bath, and 20 ml of 3.5% hydrochloric acid was added, followed by heating for dissolution. Sodium in this solution was quantified by the ICP emission spectroscopic analyzer (SPS-1200A, manufactured by Seiko Instruments Inc., measuring condition: plasma power 0.9 kW, wavelength 589 nm).

The results of the butyralization degree of the obtained polyvinylbutyral resin and the amount of sodium in the resin measured by the ICP analysis, are summarized in Table 3.

EXAMPLE c2

In Example c1, the feeding rates of the polyvinyl alcohol aqueous solution, 35% hydrochloric acid and butylaldehyde were adjusted to be 10 kg/hr, 0.33 kg/hr and 0.73 kg/hr, respectively (total of the respective average retention times in the reactors of the second reaction apparatus: about 4.1 hours).

EXAMPLE c3

In Example c1, the feeding rates of the polyvinyl alcohol aqueous solution, 35% hydrochloric acid and butylaldehyde were adjusted to be 20 kg/hr, 0.67 kg/hr and 1.8 kg/hr, respectively (total of the respective average retention times in the reactors of the second reaction apparatus: about 2.0 hours).

EXAMPLE c4

In Example c1, the feeding rates of the polyvinyl alcohol aqueous solution, 35% hydrochloric acid and butylaldehyde were adjusted to be 10 kg/hr, 0.33 kg/hr and 0.73 kg/hr, respectively, and two reactors of the second reaction apparatus, having an internal capacity of 15 liters were used in series (total of the respective average retention times in the reactors of the second reaction apparatus: about 2.7 hours), and the reaction fluid was continuously discharged.

EXAMPLE c5

In Example c1, one reactor having an internal capacity of 50 liters, of the second reaction apparatus, was used, and the reaction fluid was fed from a lower portion of this reactor, and the slurry was continuously discharged from an upper portion of the reactor (the average retention time in the reactor of the second reaction apparatus: about 3.0 hours).

EXAMPLE c6

An aqueous polyvinyl alcohol solution was prepared as follows. Into a SUS dissolution tank of 2000 liters, 1656000 parts of pure water and 144000 parts of polyvinyl alcohol having an average polymerization degree of 1700 and a saponification degree of 98.8 mol %, were put and heated to completely dissolve the polyvinyl alcohol.

As the reactor of the first reaction apparatus, a tank type closed reactor made of glass and having a capacity of 2 liters, which had three inlets at a lower portion of the reactor and one discharge outlet at an upper portion of the reactor (the reactor of the first reaction apparatus), was made ready. Pure water was filled into the reactor of the first reaction apparatus, and the internal temperature was maintained to be 30° C. with stirring (anchor vanes, 400 rpm).

Then, the above-mentioned polyvinyl alcohol aqueous solution, 35% hydrochloric acid as an acid catalyst, and butyl aldehyde (purity: 99.5%) as an aldehyde, were made ready, and they were fed from a lower portion of the reactor, so that the respective feeding rates would be 30 kg/hr, 1.0 kg/hr and 2.1 kg/hr, to carry out the acetalization reaction, and the first reaction fluid was continuously discharged from an upper portion of the reactor (the average retention time in the reactor of the first reaction apparatus: about 3.6 minutes).

Then, the first reaction fluid was fed in the same procedure as in Example c1 into eight closed reactors made of glass and having an internal capacity of 10 liters disposed in series as reactors of the second reaction apparatus (outer temperature: 35° C., stirring with anchor vanes: 300 rpm), while the reaction fluid was discharged from an upper portion of the reactors, so that while continuously carrying out the aging reaction in the second reaction apparatus, the second reaction fluid was finally discharged from an upper portion of the 8th reactor of the second reaction apparatus (total of the respective average retention times in the reactors of the second reaction apparatus: about 2.4 hours).

The second reaction fluid (slurry) discharged from the second reaction apparatus was stored in a tank of 2000 liters. Then, an aqueous sodium hydroxide solution was added to the slurry to adjust the pH to 8. Thereafter, in the same procedure as in Example c1, a polyvinylbutyral resin was obtained.

COMPARATIVE EXAMPLE c1

A glass reactor having an internal capacity of 15 liters, which was similar to Example c1 but which has no inlet at a lower portion of the reactor, was made ready. A 9% polyvinyl alcohol aqueous solution, 35% hydrochloric acid and butylaldehyde were made ready under such a condition that the feeding amounts into the reactor per unit hour would be the same ratio as in Example c1, i.e. 6000 g, 200 g and 440 g, respectively. In a state where the stirring vanes of the reactor were rotated, the three types of raw materials were simultaneously added batchwise from separate inlets at an upper portion of the reactor. Upon expiration of 1.8 minutes, the mixture was quickly transferred to a separate aging tank made of glass and having an internal capacity of 15 liters batchwise. An aging reaction was carried out by maintaining at 40° C. for 2.7 hours with stirring (anchor vanes: 400 rpm). Thereafter, in accordance with the procedure as in Example c1, a polyvinylbutyral resin was obtained.

EXAMPLE d1

An aqueous polyvinyl alcohol solution as one of the raw materials was prepared as follows. Into a SUS dissolution tank of 15 liters, 9000 parts of pure water and 1000 parts of polyvinyl alcohol having an average polymerization degree of 1800 and a saponification degree of 99.1 mol %, were put and heated to completely dissolve the polyvinyl alcohol. Then, the aqueous polyvinyl alcohol solution was maintained at 50° C.

A tank type reactor made of glass and having a capacity of 6 liters, provided with a stirring mechanism (stirring vanes: anchor vanes made of Teflon (registered trademark) with d/D=0.65), was made ready. Three supply tubes serving also as baffles, were attached from three positions at an upper portion of the reactor. One liter of pure water was charged, and the temperature was adjusted at 35° C. Then, with stirring (stirring rotational speed: 65 rpm), the 10% polyvinyl alcohol aqueous solution, butylaldehyde and 20% hydrochloric acid were fed from the respective supply tubes. The respective feeding rates were 16.7 ml/min, 1.30 ml/min and 1.09 ml/min (the feeding volumes of the raw materials per unit hour: 1.15 liters/hr, V/v≈0.0.87). During the feeding, the stirring rotational speed was gradually raised (from 65 to 120 rpm) with an increase of the liquid surface.

During this series of operations, the internal temperature was controlled by using a jacket of the reactor and maintained at 30° C. When the total amount fed into the reactor became 4 liters (the total liquid amount including the preliminarily charged 20% hydrochloric acid: 5 liters), feeding of the raw materials was stopped. In this state, the acetalification reaction was continued for one hour. Upon expiration of one hour, warm water was circulated into the jacket to heat the reactor, and the internal temperature was maintained at 55° C. In this state, the stirring rotational speed was raised from 120 to 140 rpm and maintained for two hours. Thus, a polyvinylacetal (slurry) was obtained.

Then, an aqueous sodium hydroxide solution was added to adjust the pH to 9. After cooling to room temperature, this slurry was dehydrated by a centrifugal separator to a water content of 45% and then diluted by an addition of water in an amount of 10 times to the resin component, and washed with water by stirring for 30 minutes. This operation of dehydration and washing with water was repeated three times, and the obtained slurry was dehydrated again and then dried to obtain a white powdery polyvinylbutyral resin. Here, the temperature of water used for washing with water, was 25° C. in each case.

The specific surface area per unit weight of the resin powder measured by means of automatic porosimeter autopore IV500, manufactured by Shimadzu Corporation, was 3.3 m$^2$/g.

The content of sodium element in the resin as measured by an ICP emission elemental analysis, was 11 ppm.

The results of the butyralization degree of the obtained polyvinylbutyral resin, the specific surface area of the resin powder measured by the porosimeter, the particle size and the amount of sodium in the resin measured by ICP, are summarized in Table 4.

EXAMPLE d2

The operation was carried out under the same conditions as in Example d1 except that the internal temperature of the reactor was changed to 25° C., and 1 liter of 1% hydrochloric acid was preliminarily charged into the reactor.

EXAMPLE d3

In Example d1, the operation was carried out by adjusting the feeding rates of the polyvinyl alcohol aqueous solution, butylaldehyde and 20% hydrochloric acid to be 9.8 ml/min, 0.77 ml/min and 0.64 ml/min (the volume of the raw materials fed per unit hour: 0.67 liters/hr, V/v≈1.49).

EXAMPLE d4

In Example d1, the operation was carried out by using three-bladed sweptback vanes (d/D=0.64) and medium paddle vanes (d/D=0.60) as stirring vanes.

EXAMPLE d5

In Example d1, the operation was carried out by using a tank type reactor made of glass and having a capacity of 6 liters, which was provided with a stirring mechanism at a lower portion of the reactor (stirring vanes: anchor vanes made of Teflon (registered trademark) with d/D=0.65).

EXAMPLE d6

An aqueous polyvinyl alcohol solution as one of the raw materials was prepared as follows. Into a SUS dissolution tank of 2 m$^3$, 900000 parts of pure water and 100000 parts of polyvinyl alcohol having an average polymerization degree of 1800 and a saponification degree of 99.0 mol %, were put and heated to completely dissolve the polyvinyl alcohol. Then, the mixture was maintained at 45° C.

A tank type reactor having a capacity of 1 m$^3$ (glass lining on the inner surface) which was provided with a stirring mechanism (stirring vanes: max blend vanes (d/D=0.55), manufactured by Sumitomo Heavy Industries, Ltd., and coated with Teflon (registered trademark)) was made ready. From three positions at an upper portion of the reactor, three supply tubes serving also as baffles, were attached. 150 liters of pure water was charged, and the temperature was adjusted at 32° C.

Then, with stirring (stirring rotational speed: 50 rpm, power per unit volume Pv=0.14 kW/m$^3$), a 10% polyvinyl alcohol aqueous solution, butylaldehyde and 35% hydrochloric acid were fed from the respective supply tubes. The respective feeding rates were 100 liters/hr, 7.7 liters/hr and 3.1 liters/hr, respectively (the total volume fed per unit hour: 110.8 liters/hr, V/v≈1.35). During the feeding, the stirring rotational speed was gradually raised (from 50 to 60 rpm, power per unit volume at termination of feeding of the raw materials: Pv=0.14 kW/m$^3$), as the liquid level increased. During this period, the internal temperature was controlled at 32° C. by cooling with water through the jacket of the reactor. When the total amount of the liquid in the reactor reached 900 liters, feeding of the raw materials was stopped. In this state, the acetalization reaction was continued for one hour.

Then, the internal temperature of the reactor was raised to 55° C. and maintained for two hours to carry out the aging reaction. Thus, a polyvinylacetal (slurry) was obtained. Thereafter, in the same procedure as in Example d1, a polyvinylacetal powder was prepared.

COMPARATIVE EXAMPLE d1

A glass reactor having an internal capacity of 2 liters, which was similar to Example d1 but which had no inlet at a lower portion of the reactor, was made ready. A 10% polyvinyl alcohol aqueous solution, butylaldehyde and 20% hydrochloric acid were made ready under such a condition that the amounts fed into the reactor per unit time would be the substantially the same ratio as in Example d1, i.e. 900 g, 68 g and 59 g, respectively. In a state where the stirring vanes of the reactor were rotated, the three types of raw materials were added simultaneously from separate inlets at an upper portion of the reactor. Upon expiration of one hour, the inner temperature was raised to 55° C. and maintained for two hours to carry out an aging reaction. Thereafter, in accordance with the procedure in Example d1, a polyvinylbutyral resin powder was finally obtained.

COMPARATIVE EXAMPLE d2

In Example d1, the operation was carried out without preliminarily charging pure water into the reactor. Immediately after feeding the polyvinyl alcohol aqueous solution, butylaldehyde and 20% hydrochloric acid, white blocks of a resin were formed at the bottom of the reactor, and the inlets of the raw materials were clogged.

INDUSTRIAL APPLICABILITY

According to the present invention, it is possible to provide a porous polyvinylacetal resin powder having a specific surface area of from 1.5 to 3.5 m$^2$/g, which has a very low content of a metal component such as an alkali metal and thus is excellent in transparency, moisture resistance and electrical insulating properties and whereby sticking to the production equipment such as the reactor or piping is scarce.

Further, the present invention provides a process whereby the above-mentioned polyvinylbutyral resin of high quality can be continuously produced constantly over a long period of time by a production equipment smaller than before or by an economical production equipment having freeness in design or installation site increased, while suppressing deposition of the polyvinylacetal resin on the reactor, the piping or the like.

TABLE 1

|  | Ex. | | | | | | | | Comp. Ex. | |
| --- | --- | --- | --- | --- | --- | --- | --- | --- | --- | --- |
|  | a1 | a2 | a3 | a4 | a5 | a6 | a7 | a8 | a1 | a2 |
| Butyralization degree of the reaction product at the discharge outlet of the reactor (mol %) | 41 | 19 | 25 | 39 | 35 | 37 | 43 | 35 | 49 | 47 |
| Butyralization degree of the resin powder (mol %) | 68 | 65 | 66 | 68 | 67 | 67 | 68 | 66 | 69 | 69 |
| Specific surface area (m$^2$/g) | 2.6 | 2.5 | 2.7 | 3.0 | 2.8 | 2.8 | 3.0 | 1.7 | 0.7 | 0.9 |
| Bulk density (g/cm$^3$) | 0.16 | 0.16 | 0.15 | 0.15 | 0.16 | 0.16 | 0.14 | 0.19 | 0.21 | 0.20 |
| Particle size (μm) | 1.3 | 1.3 | 1.3 | 1.2 | 1.3 | 1.4 | 1.2 | 2.4 | 4.8 | 5.3 |
| Amount of sodium in the resin (ppm) | 20 | 45 | 57 | 31 | 29 | 15 | 11 | 78 | 118 | 122 |

TABLE 2

|  | Ex. | | | | | | | | Comp. Ex. | | | | |
| --- | --- | --- | --- | --- | --- | --- | --- | --- | --- | --- | --- | --- | --- |
|  | b1 | b2 | b3 | b4 | b5 | b6 | b7 | b8 | b1 | b2 | b3 | b4 | b5 |
| Average retention time in the reactor (min) | 60 | 60 | 120 | 240 | 40 | 60 | 120 | 120 | — | 13 | 26 | 60 | 60 |
| Internal temperature of the reactor (° C.) | 32 | 25 | 32 | 37 | 45 | 45 | 20 | 50 | 32 to 37* | 32 | 32 | 5 | 65 |

TABLE 2-continued

| | Ex. | | | | | | | | Comp. Ex. | | | | |
|---|---|---|---|---|---|---|---|---|---|---|---|---|---|
| | b1 | b2 | b3 | b4 | b5 | b6 | b7 | b8 | b1 | b2 | b3 | b4 | b5 |
| Butyralization degree of the reaction fluid at the discharge outlet of the reactor (mol %) | 58 | 52 | 60 | 61 | 61 | 61 | 54 | 63 | 53 | 45 | 47 | 28 | —** |
| Butyralization degree of the resin powder (mol %) | 70 | 69 | 71 | 71 | 71 | 72 | 68 | 72 | 67 | 68 | 68 | 66 | — |
| Specific surface area ($m^2/g$) | 3.2 | 3.3 | 3.1 | 3.3 | 2.8 | 2.8 | 3.3 | 2.3 | 0.8 | 2.8 | 2.9 | 1.2 | — |
| Particle diameter (μm) | 1.1 | 1.2 | 1.2 | 1.3 | 1.2 | 1.2 | 0.9 | 1.9 | 5.1 | 1.3 | 1.2 | 3.0 | — |
| Amount of sodium in the resin (ppm) | 18 | 15 | 15 | 13 | 18 | 11 | 20 | 29 | 137 | 17 | 20 | 120 | — |
| Weight of deposit upon expiration of 5 hours of feeding (g) | 58 | 39 | 37 | 19 | 65 | 60 | 67 | 72 | —*** | 210 | 107 | 141 | — |

*The temperature increased to 37° C. by heat generation during the reaction.
**The operation was stopped, as the overflow piping was clogged.
***Not measured because of the batch reaction.

TABLE 3

| | Ex. | | | | | | Comp. Ex. |
|---|---|---|---|---|---|---|---|
| | c1 | c2 | c3 | c4 | c5 | c6 | c1 |
| Volume of the reactor of the first reaction apparatus (liters) | | | 0.5 | | | 2 | 15 |
| Average retention time (min) | 1.8 | 2.7 | 1.3 | 2.7 | 1.8 | 3.6 | 1.8 |
| Number of reactors of the second reaction apparatus | 3 | 3 | 3 | 2 | 1 | 8 | 1 |
| Each volume (liters) | 15 | 15 | 15 | 15 | 50 | 10 | 15 |
| Total of average retention times (hr) | 2.7 | 4.1 | 2.0 | 2.7 | 3.0 | 2.4 | 2.7 |
| Butyralization degree at the discharge outlet of the reactor of the second reaction apparatus (mol %) | 68 | 69 | 65 | 69 | 68 | 68 | 68 |
| Amount of sodium in the resin (ppm) | 13 | 11 | 17 | 12 | 17 | 9 | 123 |

TABLE 4

| | Ex. | | | | | | Comp. Ex. | |
|---|---|---|---|---|---|---|---|---|
| | d1 | d2 | d3 | d4 | d5 | d6 | d1 | d2 |
| Butyralization degree of the resin powder (mol %) | 72 | 71 | 72 | 72 | 72 | 72 | 68 | —* |
| Specific surface area ($m^2/g$) | 3.3 | 3.2 | 3.1 | 3.3 | 3.1 | 3.4 | 0.7 | — |
| Particle size (μm) | 1.0 | 1.0 | 1.0 | 1.1 | 1.0 | 0.9 | 5.0 | — |
| Amount of sodium in the resin (ppm) | 9 | 7 | 11 | 10 | 15 | 13 | 109 | — |

*No powder was obtained.

The invention claimed is:

1. A polyvinylacetal resin obtained by reacting polyvinyl alcohol and an aldehyde in the presence of an acid catalyst, and wherein the resin has an acetalization degree of at least 60 mol % and a specific surface area of from 1.50 to 3.50 $m^2/g$ a bulk density of from 0.12 to 0.19 $g/cm^3$, an average particle diameter of from 0.5 to 2.5 μm and a metal content of at most 80 ppm.

2. A process for producing a polyvinylacetal resin, comprising feeding a reaction fluid comprising polyvinyl alcohol, an aldehyde and an acid catalyst into a first reactor, to carry out an acetalization reaction, discharging the reaction fluid wherein the acetalization degree has reached from 10 to 60 mol %, and feeding the same into a second reactor to carry out a further reaction to bring the acetalization degree of polyvinylacetal to at least 65 mol %, wherein the polyvinylacetal resin has a specific surface area of from 1.50 to 3.50 $m^2/g$ a bulk density of from 0.12 to 0.19 $g/cm^3$, an average particle diameter of from 0.5 to 2.5 μm and a metal content of at most 80 ppm.

3. The process for producing a polyvinylacetal resin according to claim 2, wherein the first reactor is a closed reactor provided with a stirring mechanism.

4. The process for producing a polyvinylacetal resin according to claim 2, wherein the reaction temperature in the first reactor is within a range of from 10 to 60° C.

5. The process according to claim 4, wherein the reaction temperature in the first reactor is from 20 to 50° C.

6. The process according to claim 4, wherein the reaction temperature in the first reactor is from 25 to 45° C.

* * * * *